United States Patent
Dickeson et al.

(10) Patent No.: US 8,721,345 B2
(45) Date of Patent: May 13, 2014

(54) APPARATUS, SYSTEM, AND METHOD FOR DETERMINING A CHANGE IN TEST RESULTS

(76) Inventors: Blake Dickeson, Orlando, FL (US); James Scheel, Winter Springs, FL (US)

( * ) Notice: Subject to any disclaimer, the term of this patent is extended or adjusted under 35 U.S.C. 154(b) by 119 days.

(21) Appl. No.: 12/854,044

(22) Filed: Aug. 10, 2010

(65) Prior Publication Data

US 2011/0039243 A1 Feb. 17, 2011

Related U.S. Application Data

(60) Provisional application No. 61/233,742, filed on Aug. 13, 2009.

(51) Int. Cl.
*G09B 3/00* (2006.01)
*G09B 7/00* (2006.01)

(52) U.S. Cl.
USPC .......................................................... 434/322

(58) Field of Classification Search
CPC ............ G09B 3/00; G09B 7/00; G09B 11/00; G06F 15/16; G06Q 50/00; G06Q 10/00
USPC ................................................. 434/322, 323
See application file for complete search history.

(56) References Cited

U.S. PATENT DOCUMENTS

| | | | | |
|---|---|---|---|---|
| 5,590,057 A | * | 12/1996 | Fletcher et al. | 702/182 |
| 6,606,480 B1 | * | 8/2003 | L'Allier et al. | 434/362 |
| 7,509,263 B1 | * | 3/2009 | Fiedotin et al. | 705/3 |
| 7,818,185 B2 | * | 10/2010 | Bjorner et al. | 705/3 |
| 7,918,666 B1 | * | 4/2011 | Lewolt | 434/322 |
| 2001/0041330 A1 | * | 11/2001 | Brown et al. | 434/332 |
| 2003/0162152 A1 | * | 8/2003 | Lee | 434/162 |
| 2006/0240395 A1 | * | 10/2006 | Faist et al. | 434/322 |
| 2008/0177836 A1 | * | 7/2008 | Bennett | 709/205 |
| 2008/0208632 A1 | | 8/2008 | Rosenblum et al. | |
| 2009/0042176 A1 | | 2/2009 | Nam | |
| 2009/0254363 A1 | * | 10/2009 | Mohaideen | 705/2 |

FOREIGN PATENT DOCUMENTS

| | | |
|---|---|---|
| KR | 20000030514 | 6/2000 |
| KR | 20030053415 | 6/2003 |

* cited by examiner

*Primary Examiner* — Kesha Frisby
(74) *Attorney, Agent, or Firm* — Kunzler Law Group (57) ABSTRACT

An apparatus for determining a change in test results includes a storage module, a pre-test module, a post-test module, a grading module and a summary creation module. The storage module stores a plurality of questions and a correct answer to each question. The pre-test module submits a group of pre-test questions to a user and receives answers to the pre-test questions from the user ("pre-test answers"). The post-test module, in response to the user being exposed to educational material related to the pre-test questions, submits a group of post-test questions to the user and receives answers to the post-test questions from the user ("post-test answers"). The grading module compares the pre-test answers and the post-test answers. The summary creation module creates a session summary including a comparison between the pre-test answers and the post test answers. The questions and answers are submitted and received over a computer network.

18 Claims, 6 Drawing Sheets

HEALTHY TUTOR　　　　　　　　　　　　　　　Orange County Medical Specialists
KNOWLEDGE PERFORMANCE SUMMARY　　　123 E. Main Street, Orlando, FL 32803
　　　　　　　　　　　　　　　　　　　　　　　　　　　　　　　(407)555-1212

602:
| DOE, JOHN | DOB: 07/07/1960 | AGE: 48 | ACCT: D6704 |
|---|---|---|---|
| SESSSION DATE | SESSION BEGAN | SESSION ENDED | SESSION DURATION |
| Tues, Aug 07, 2008 | 09:52 AM | 10:01 AM | 9m27s |

604:

SESSION: Smoking – The Facts

| PRETEST | POST TEST | PRETEST | POST TEST |
|---|---|---|---|
| 1. INCORRECT | CORRECT | 6. INCORRECT | CORRECT |
| 2. INCORRECT | CORRECT | 7. CORRECT | CORRECT |
| 3. INCORRECT | CORRECT | 8. CORRECT | CORRECT |
| 4. INCORRECT | CORRECT | 9. INCORRECT | CORRECT |
| 5. CORRECT | CORRECT | 10. INCORRECT | INCORRECT |

PRETEST: 3/10 (30%)
POST TEST: 9/10 (90%)

606:
1. In the United States, how many deaths per year are due to smoking?
ANSWER: About half a million
RATIONALE: Smoking is a big public health problem. In the United States, about half a million deaths per year are due to smoking.

608:
PHYSICIAN USE ONLY
Total Additional Face To Face Counseling Time
| 　　5　　| 　　10　　| 　　15　　| 　　20　　| 　　25　　| 　　30　　|

_________________________
Provider Signature / Date

FIG. 6

APPARATUS, SYSTEM, AND METHOD FOR DETERMINING A CHANGE IN TEST RESULTS

CROSS-REFERENCES TO RELATED APPLICATIONS

This application claims priority to U.S. Provisional Patent Application Ser. No. 61/233,742 entitled "APPARATUS, SYSTEM, AND METHOD FOR DETERMINING AN IMPROVEMENT IN TEST RESULTS" and filed on 13 Aug. 2009 for Blake Dickeson et. al., which is incorporated herein by reference.

BACKGROUND

1. Field of the Invention

This invention relates to testing and more particularly relates to testing a change in knowledge based on exposure to educational material.

2. Description of the Related Art

Students are often presented with educational material to teach them information on a subject or a skill. After the presentation of the educational material, students are generally tested to determine how well the student knows the subject or to measure the student's skill. With students coming from a wide range of backgrounds, experiences, and educational levels, it is often difficult to determine effectiveness of the educational material. In certain situations, such as certifying for a skill or degree, where and how the student gained the knowledge may not be relevant. However, the effectiveness of different methods and types of educational material in helping a student to learn is often of interest. For example, the designers of educational material may like to know how to improve the material and purchasers of the material would like to see proof about what material is best.

Using the method of a lecture or presentation of educational material followed by a test, as described above, gives little understanding of the effectiveness of a teaching method or of educational material, or any improvements in knowledge made by a student. For example, a good score on a test only shows that the student knows the correct answer, not when or how he or she learned the correct answer, or if the educational material presented improved the student's knowledge. It is possible that the student already knew the answers prior to the presentation or lecture and learned very little. Alternatively, a moderate score on the test may indicate that the student began with little knowledge on a subject and learned a fair amount, or that the student already knew a fair amount and learned little. Thus, this method provides little, if any, information about the effectiveness of the particular educational material.

SUMMARY

From the foregoing discussion, it should be apparent that a need exists for an apparatus, system, and method that measures a change in knowledge based on exposure to educational material. Beneficially, such an apparatus, system, and method would allow users and providers to quickly determine a change in knowledge and, in healthcare applications, meet billing and reimbursement requirements.

The present invention has been developed in response to the present state of the art, and in particular, in response to the problems and needs in the art that have not yet been fully solved by currently available testing methods. Accordingly, the present invention has been developed to provide an apparatus, system, and method for testing users that overcome many or all of the above-discussed shortcomings in the art.

An apparatus to determine change in test results is provided with a plurality of modules configured to functionally execute the necessary steps. These modules in the described embodiments include a storage module, a pre-test module, a post-test module, a grading module, and a summary creation module. The storage module stores a plurality of questions and a correct answer to each question in a data storage repository. The pre-test module submits a group of pre-test questions to a user and receives answers to the pre-test questions from the user ("pre-test answers"). The group of pretest questions is selected from the plurality of questions.

The post-test module, in response to the user being exposed to educational material related to the pre-test questions, submits a group of post-test questions to the user and receives answers to the post-test questions from the user ("post-test answers"). The post-test questions are selected from the plurality of questions and are related to the educational material. The grading module compares the pre-test answers and the post-test answers to the correct answer for each corresponding question and marks an answer correct in response to the answer matching the correct answer for the corresponding question. The summary creation module creates a session summary that includes a comparison between the pre-test answers and the post test answers. The pre-test questions and post-test questions are submitted over a computer network and the pre-test answers and post-test answers are received over the computer network In one embodiment, the session summary may include an overall score on the pre-test questions and an overall score on the post-test questions, a comparison between an overall score on the pre-test questions and an overall score on the post-test questions, and/or a comparison between pre-test answers and post-test answers for questions on similar topics. In another embodiment, the group of pre-test questions and the group of post-test questions include one or more of the same questions. In another embodiment, the comparison between the pre-test answers and the post-test answers includes comparing a pre-test answer and a post-test answer that corresponds to the same question based on a difference between the pre-test answer and the post-test answer.

In one embodiment the session summary further includes the pre-test questions, the post-test questions, the pre-test answers, the post-test answers, the correct answers to the pre-test questions, the correct answers to the post-test questions, an explanation corresponding to each correct answer, and/or an explanation corresponding to each incorrect answer. The apparatus, in one embodiment, also includes a presentation module that presents the educational material related to the pre-test questions to the user in response to the receipt of the answers to the group of pre-test questions from the user.

In one embodiment, the group of pre-test questions and the group of post-test questions are related to health education. In another embodiment, the summary creation module also sends the session summary to the user, a designer of the educational material, a health provider, a corporate wellness provider, a personal health records system, an electronic medical records system, and/or a secure session summary database. In another embodiment, the summary creation module performs a send transaction that sends the session summary to the secure session summary database, where user identifying information, the user pre-test answers, and the user post-test answers are stored in the secure session summary database. In another embodiment, the secure session summary database is accessible from a plurality of locations over the computer network. In yet another embodiment, the secure session summary database and the send transaction are Health Insurance Portability and Accountability Act ("HIPAA") compliant.

According to one embodiment, the session summary also includes a provider records section for recording provider interaction with the user. According to another embodiment, the session summary includes information satisfying requirements for medical insurance reimbursement and/or Medicare reimbursement. According to one embodiment, the session summary also includes a medical billing code.

In a further embodiment, the apparatus may include a group test module that tests a group during a group education session and maintains personal user information and user answers confidential. The group includes the user and one or more additional users and the group education session includes concurrently pre-testing, teaching, and post-testing the user and the one or more additional users in the group. In one embodiment, the group test module includes an automated response system that receives answers from the user and the one or more additional users, where the user and the one or more additional users each submit the answers using an electronic device.

According to one embodiment, the apparatus further includes a session management module that allows the user to selectively begin a new education session in response to receiving the user post-test answers. An education session includes pre-testing, presenting educational material, and post-testing the user.

A system of the present invention is also presented to determine a change in test results. The system may be embodied in a plurality of hardware and/or software components. In particular, the system, in one embodiment, includes a data storage device that stores a plurality of questions, a processor, and an apparatus for determining a change in test results. The apparatus for determining a change in test results may include the embodiments, modules, and variations mentioned above.

The system may further include an automated response system that receives answers from the user and the one or more additional users. The user and the one or more additional users may each submit the answers using an electronic device.

A method of the present invention is also presented for determining a change in test results. The method in the disclosed embodiments substantially includes the steps necessary to carry out the functions presented above with respect to the operation of the described apparatus and system. In one embodiment, the method includes storing a plurality of questions and a correct answer to each question in a data storage repository. The method may also include submitting a group of pre-test questions to a user and receiving answers to the pre-test questions from the user ("pre-test answers"), the group of pretest questions selected from the plurality of questions.

The method, in one embodiment, includes submitting a group of post-test questions to the user, in response to the user being exposed to educational material related to the pre-test questions, and receiving answers to the post-test questions from the user ("post-test answers"). The post-test questions are selected from the plurality of questions and are related to the educational material. The method may also include grading the pre-test answers and the post-test answers to the correct answer for each corresponding question by marking an answer correct in response to the answer matching the correct answer for the corresponding question. The method may also include creating a session summary comprising a comparison between the pre-test answers and the post test answers. In the method, the questions may be submitted and the answers are received over a network.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
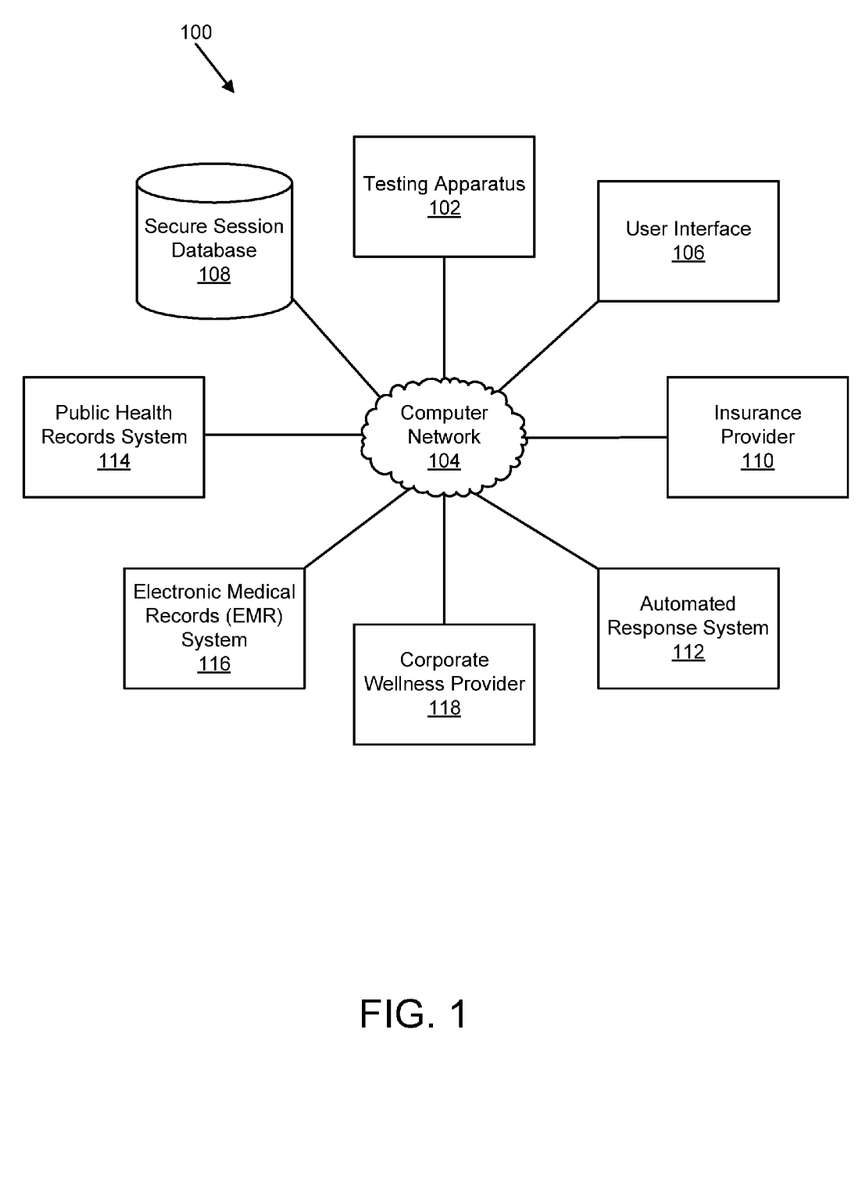
FIG. 1 is a schematic block diagram illustrating one embodiment of a system for determining change in test results in accordance with the present invention.

FIG. 1 depicts one embodiment of a system 100 for determining change in test results. In the depicted embodiment, the system 100 includes a testing apparatus 102, a computer network 104, and a user interface 106. The system also optionally includes one or more of a secure session database 108, an insurance provider 110, an automated response system 112, a public health records system 114, an electronic medical records system 116, and a corporate wellness provider 118.

According to one embodiment, the testing apparatus 102 provides at least a portion of an education session for a user. As used herein, the term education session refers to pre-testing a user, presenting educational material to the user, and post-testing the user, as described below. The testing apparatus 102 may also provide a session summary to the user and/or another party involved in the user's health. As used herein the terms user, student, patient and other similar terms may, but do not necessarily, refer to the same individual. In some embodiments, these terms may be used to refer generally to an individual who is pre-tested and post-tested.

The testing apparatus 102 pre-tests a user by submitting a group of pre-test questions to the user and receiving the user's answers ("pre-test answers") to the pre-test questions. In response to pre-testing the user, the user is presented with educational material. According to one embodiment, the testing apparatus 102 presents the educational material. In another embodiment, a human or a separate apparatus presents the educational material to the user. In response to the presentation of educational material, the testing apparatus 102 post-tests the user by submitting a group of post-test questions to the user and receiving the user's answers ("post-test answers"). The testing apparatus 102 grades the pre-test answers and post-test answers and creates a session summary that includes a comparison between the pre-test answers and the post-test answers. The session summary is then sent to the user and/or another party involved in the user's health.

The comparison between the pre-test answers and the post-test answers can be used to determine what the user learned by being exposed to the educational material. Designers of educational material may wish to use this information to improve the educational material or associated presentation methods. The comparison may also indicate to instructors, teaching institutions, or others interested in a user's education how effective the material is or how attentive a user was when exposed to the material. The operation and uses of the testing apparatus 102 will be described in further detail below in relation to the other system components.

In the depicted embodiment, the testing apparatus 102 operates over the computer network 104 to provide an education session. In one embodiment, the computer network 104 includes one or more nodes which are electronically interconnected such that information may be communicated between devices connected to the nodes. According to one embodiment, the nodes include physical and/or wireless connection points through which the devices may be connected to access the network. In one embodiment, the connected devices may include a device having a processor such as a computer, a phone, or the like. In one exemplary embodiment, the computer network 104 includes the Internet.

According to one embodiment, the testing apparatus 102 provides a portion of an education session to a user on the user interface 106. The user interface 106 may include a display screen, processor, memory, and/or the like. For example, the user interface 106 may be a personal computer. In another example, the user interface 106 is located within the home of a user. In other examples, the user interface 106 may be located in a testing center, a health care provider's office, a community health center, or the like. In one exemplary embodiment, an education session is entirely web based such that a user may complete an education session from anywhere that has Internet access with little or no installation. For example, the testing apparatus 102 may include a web server which can be accessed via a web browser.

In the depicted embodiment, the user interface 106 communicates with the testing apparatus 102 over the computer network 104. A user on the user interface 106 may, for example, access the testing apparatus 102 by entering a uniform resource locator (URL) that corresponds to a website that allows access to the testing apparatus 102. The user interface 106 and the testing apparatus 102 may communicate with each other using TCP/IP and/or other communication protocols well known in the art, without limitation. The user may then log in using a user name or email address and start an education session. In another embodiment, the user on the user interface 106 may begin an education session by entering personal identifying information. Alternatively, the testing apparatus 102 may assign and display an identification number on the user interface 106. The user may then use the personal identifying information or the identification number to gain access to the session summary or other results from an education session.

When the education session begins, the testing apparatus 102 may submit a group of pre-test questions to the user on the user interface 106 over the computer network 104, or the like. The user enters pre-test answers to the pre-test questions on the user interface 106, which the testing apparatus 102 receives over the computer network 104. In response to receiving the pre-test answers from the user, the testing apparatus 102 presents educational material over the computer network 104 to the user interface 106.

According to one exemplary embodiment, the educational material is not presented by the testing apparatus 102. For example, the testing apparatus 102 may not include a presentation module 212, in which case the educational material may be presented by an instructor and/or a separate apparatus. The educational material presented over the computer network 104 may include multimedia information such as text, images, video, sound, etc. The content of the educational material is not limited in either format or content, but may be related to the pre-test questions that the testing apparatus 102 submits.

After the user is exposed to the educational material, the testing apparatus 102 submits a group of post-test questions over the computer network 104 to the user interface 106 for the user to view. As will be clear to one skilled in the art in light of the present disclosure, if the post-test questions are identical to the pre-test questions it may not be necessary for the testing apparatus 102 to resubmit them. The user may provide post-test answers through the user interface 106 and the computer network 104 to the testing apparatus 102.

After receiving the post-test answers, in one embodiment, the testing apparatus 102 grades the pre-test answers and the post-test answers of the user. In a further embodiment, the testing apparatus 102 creates a session summary that includes a comparison between the pre-test answers and the post-test answers. The comparison is such that a person viewing the session summary may quickly and easily determine what the user has or has not learned by being exposed to the educational material.

In one embodiment, the comparison between the pre-test answers and the post-test answers includes an overall score on the pre-test questions and an overall score on the post-test questions. Thus, a user viewing the session summary will be able to quickly determine the effect the educational material had on the user's knowledge. In another embodiment, the comparison includes a breakdown of the questions by topic or subtopic. For example, the session summary may include a list of all of the pre-test and post-test questions grouped according to topic and/or sub-topic. Viewing this breakdown may help show which portions of the educational material were most effectively taught. Furthermore, the breakdown by topic or subtopic may also help a viewer of the session summary understand what topics or subtopics are most effectively taught in a given manner. Details of the session summary and comparison between the pre-test and post-test questions are discussed in more detail in relation to FIGS. 2A-2B below.

The testing apparatus 102 may send the session summary to various locations over the computer network 104. In one embodiment, the testing apparatus 102 may send the session summary to the user interface 106 or another location corresponding to the user, such as an email address. In another embodiment, the testing apparatus 102 may send the session summary over the computer network 104 to a secure session database 108.

Typically, the secure session database 108 includes information about education sessions completed by users on the testing apparatus 102. For example, the database may include personal identifying information, pre-test and post-test answers, the educational material presented, how the educational material was presented, the time and date of each education session, and the like. The secure session database 108 typically resides on computer readable media accessible to the testing apparatus 102, such as a hard disk drive, an optical drive, solid-state storage, etc. The session summary that is sent by the testing apparatus 102 may be in a variety of forms including database form, spreadsheet form, document form, such as PDF or word processing document forms, or the like.

According to one exemplary embodiment, the pre-test questions, the educational material, and the post-test questions are all related to one or more health education topics. The education session may be part of patient treatment and may be billable by a health provider to an insurance provider 110. In one embodiment, the testing apparatus 102 sends the session summary to the insurance provider 110 for billing purposes. The insurance provider 110 may include a private insurance company or a publicly provided insurance such as Medicare. In one embodiment, the session summary is sent to the insurance provider 110 via fax, email, or the like. Alternatively or additionally, the insurance provider 110 may be authorized to access certain data in the secure session database 108, such as a specific user's session summary.

The session summary may further include a medical billing code and health care provider information. One example of billing codes that insurance companies use is the Current Procedural Terminology ("CPT") code set, which is developed, maintained and copyrighted by the American Medical Association. The CPT code set identifies procedures and tasks performed by a health provider. Insurance companies may require the health provider to list a CPT code for each service in order to receive payment. For Medicare patients, Healthcare Common Procedure Coding System (HCPCS) codes are similarly used for billing to Medicare. Examples of medical billing codes and billing methods for an education session are listed under the Medical Billing Codes and Billing Methods heading near the end of the description, prior to the claims.

Education sessions and session summaries may be used in a variety of different environments and for a variety of different purposes. According to one embodiment, education sessions and/or session summaries may be used to meet standards and requirements for medical treatment, medical centers, medical homes, or other centers providing medical services. For example, the National Committee for Quality Assurance ("NCQA") has provided a "Patient-Centered Medical Home" certification that involves 10 standards that are applicable to certification.

According to one embodiment, the testing apparatus 102 provides education sessions and session summaries that support one or more of these 10 standards. In one embodiment, the testing apparatus 102 supports 3 of the 10 standards including active patient self-management support, clinical and/or service performance measurement by a physician or across the practice, and performance reporting by physician or across the practice. In one embodiment, education session and other features offered by the testing apparatus 102 supports NCQA programs that focus on care of patients with diabetes, cardiovascular disease, stroke, and/or back pain.

Additionally, education sessions may also meet requirements for other billing or reimbursement needs. For example, the new American Recovery and Reinvestment Act (ARRA) Federal Stimulus Meaningful Use objectives require individuals to submit detailed evidence of compliance in several areas of patient management. According to one embodiment, education sessions supplied by the testing apparatus 102 meet one or more of these meaningful use objectives. According to one embodiment, the testing apparatus 102 addresses three Federal Stimulus Meaningful Use objectives and six measures. According to one embodiment, a session summary may also include the information necessary to provide sufficient documentation.

Exemplary measures which may be met may include objectives and measures listed in the following table. OP is defined as an Outpatient setting, IP is defined as an Inpatient setting, and EP is defined as an Eligible Provider according to the Centers for Medicare and Medicaid (CMS).

| Federal Stimulus Meaningful Use |
| --- |
| 2011 Objectives and Measures. |
| % of patients with access to patient-specific educational resources [OP, IP]. |
| % of smokers offered smoking cessation counseling [EP, IP] |
| 2013 Objectives and Measures. |
| % of all patients with access to patient-specific educational resources in common primary languages [OP, IP] and |
| % of educational content in common primary languages [OP, IP]. |
| 2014 Objectives and Measures |
| % of all patients with access to self-management tools [OP], "and NPP (National Priorities Partnership) quality measures related to patient and family engagement [OP, IP]." |
| Practice based provider Meaningful Use measurable goals. |
| % of patients with A1C under control |
| % hypertensive patients with BP under control |
| % patients with LDL under control |
| % patient who received flu vaccine |

If the testing apparatus 102 and session summary are used as a part of patient medical treatment, the testing apparatus 102 may include one or more security measures to ensure that transactions involving transfer or storage of personal data and information are secure. For example, the Health Insurance Portability and Accountability Act ("HIPAA") created standards for electronic health care transactions to keep data private. The testing apparatus 102 may include security measures that meet the HIPAA standards for storage and communication of the session summary and personal information of the user. As will be clear to one skilled in the art, in light of this disclosure, the testing apparatus 102 may also include additional security measures and standards to ensure security and confidentiality of the system 100 and information shared on the system 100. For example, in one embodiment, a user may be able to provide an electronic signature in order to verify his or her identity. One or more screens, pages, or steps may allow for providing and verification of the electronic signature. As will be understood by one skilled in the art in light of the present disclosure, electronic signatures may be required and/or provided at any point within an education session or any of the process discussed herein.

In a further embodiment, the testing apparatus 102 may send the session summary to a personal health records (PHR) system 114 and/or an electronic medical records (EMR) system 116 and/or an electronic health records (EHR) system. These systems 114, 116 are systems that store medical records for users and allow for the easy sharing of medical information in a secure fashion. Typically the personal health records system 114 is a health provider maintained system where health providers may access and store medical records for patients. The records of a specific patient may be accessible to any health provider who meets certain criteria, such as location, and gaining the patient's consent. Thus, a patient may not need to carry medical records to every health provider that is visited by the patient. In one embodiment, the EMR or EHR system 116 is similar to the personal health records system 114 but is implemented electronically.

In yet another embodiment, the testing apparatus 102 may send the session summary to a corporate wellness provider 118. Corporate wellness providers 118 generally provide health services in connection with an individual's employment. The session summary may be sent via fax, email, or the like. Alternatively or additionally, the corporate wellness provider 118 may be authorized to access certain data in the secure session database 108, such as a specific user's session summary.

In embodiments where the session summary is sent to a provider, such as an insurance provider 110, a corporate wellness provider 118, a hospital, a physician, or any other provider, the testing apparatus 102 may send the session summary in the form of an electronic medical record, electronic health record, or personal health record message. In addition to including the session summary, the electronic record message may prompt the provider to address specific educational content that is not understood by the user. Evidence of what is not understood may be found in the session summary. This may allow a provider to follow up with the user to ensure that the user learns that specific content which may be important for the user's healing, future health, and/or safety. This may constitute a mechanism of clinical decision support and patient centered health education that is unique to a specific patient.

If a session summary is made available to a provider, the provider may prescribe an educational session for the specific patient. In one embodiment, the provider may prescribe a specific testing apparatus and/or specific education material. In one embodiment, the provider may prescribe the education session by utilizing an electronic health record and/or some other form of electronic entry of the prescription. Electronic entry of instructions or prescriptions is often referred to as Computerized Physician Order Entry (CPOE) or Computerized Prescriber Order Entry. Thus, this may constitute a mechanism of CPOE that is unique to a specific patient.

According to one embodiment, an EMR, EHR, and/or PHR system may automatically select and produce a system generated referral for an education session. According to one embodiment, the automatic selection and production of a generated referral may be actuated by parameters entered, for example, by a health provider, physician, and/or patient. The parameters entered may include diagnosis or treatment codes, entries regarding a patient's history and/or physical, and/or entries regarding a patient's medications.

For example, a patient may be diagnosed as having a non-insulin dependent diabetes. A health provider or patient may enter a diagnosis code into an EHR system. The EHR system may then produce a system generated referral to the patient for an "Introduction to Diabetes" education session, "Healthy Living" education session, and/or a "Carbohydrate Counting" education session. In some embodiments, such a system generated referral by the EHR system may require little or no health provider intervention.

According to one embodiment, the system generated referral may meet some of the Meaningful Use requirements as specified. For example, eligible providers, eligible hospitals, and Critical Access Hospital's (CAH's) may be required by §496.6(e)(6)(i) and §495.6(g)(5)(i) to "[u] se certified EHR technology to identify patient-specific education resources and provide those resources to the patient if appropriate." The following requirements may need to be met: "Provide electronic access to patient-specific educational resources"; "Report on the percentage of patients for whom they use the EHR to suggest patient-specific education resources"; "Technology suggests patient specific educational resources based on the information stored in the certified EHR technology"; and "Provide access to patient specific education resources upon request." According to one embodiment, the apparatus, system, and methods described herein satisfy and greatly simplify a health provider's ability to meet these requirements.

When used in healthcare environments, special terminology may be used to talk about a patient's and the education sessions. The term "knowledge level" may be used to refer to a patient's understanding or knowledge of a particular area of health or treatment. The term "knowledge therapy" may be used to refer to the use of one or more education sessions to increase the patient's knowledge level. The term "dose of knowledge therapy" may be used to refer to a knowledge therapy session. The term "knowledge enhancement" may be used to refer to the extent to which the patient's knowledge level has increased, for example as a result of a knowledge therapy session. The term "knowledge decay" may be used to refer to the extent to which the patient's knowledge level has decreased, for example over time or from misunderstanding educational material or receiving inaccurate educational material.

Education is recognized as an integral component of healthcare, such as with chronic disease management. The teaching herein may be applicable to patient centered health education that is unique to a specific patient. Just as a provider may adjust the dose of medicine according to the weight of each patient, so too may a provider adjust a dose of knowledge therapy according to the level of knowledge exhibited by each patient. When a patient's level of knowledge is sub-therapeutic or when a patient's knowledge decays over time, the provider may prescribe an additional dose of knowledge therapy. The dose of knowledge therapy may be adjusted by prescribing additional items from a menu of educational topics or by delivering supplementary counseling. Knowledge therapy may be repeated by prescribing subsequent doses of a previously completed education session. Because each patient's response to knowledge therapy may vary, this may result in a need to adjust each patient's dosing of knowledge therapy according to each patient's knowledge level of a particular topic.

In addition to providing an education session to a user on the user interface 106, the testing apparatus 102 may also provide an education session for a group of users ("group education session") on the automated response system 112. In one embodiment, the automated response system 112 includes a display, and other electronic devices by which more than one user may respond to questions presented on the display. For example, the testing apparatus 102 may pre-test multiple users with the pre-test questions shown on the display and each user may enter pre-test answers using the electronic devices.

In one embodiment, the electronic devices of the automated response system 112 include a one or more remote keypads. In one embodiment, the remote keypads operate wirelessly, similar to a television remote. In another embodiment, the remote keypads operate over a wired connection. In one embodiment, each remote keypad includes special buttons, such as buttons labeled "A" through "F", for answering questions, such as multiple choice questions. Using such a remote keypad a user can easily and confidentially select and press a button corresponding to an on-screen answer to a question. In one embodiment, the automated response system 112 relates a remote keypad with a specific user such that the buttons pressed on the remote keypad are attributed to the specific user.

In one embodiment, the automated response system 112 may include separate booths for the one or more electronic devices, such as computers, handheld devices, or the like, where users can confidentially enter their answers. The group test module 216 maintains the pre-test and post-test answers of each user confidential from the other users such that all users can be tested simultaneously without concern of having their personal data or knowledge exposed to others.

Following a group education session, the testing apparatus 102 may provide a session summary for each user. The session summaries for each use in the group education session may be sent to various locations as described above. In one embodiment, the testing apparatus 102 emails each user's session summary to their respective email address. According to another embodiment, the testing apparatus 102 sends each session summary to the secure session database 108 and where each user can access his or her respective session summary.

Figure 2A:
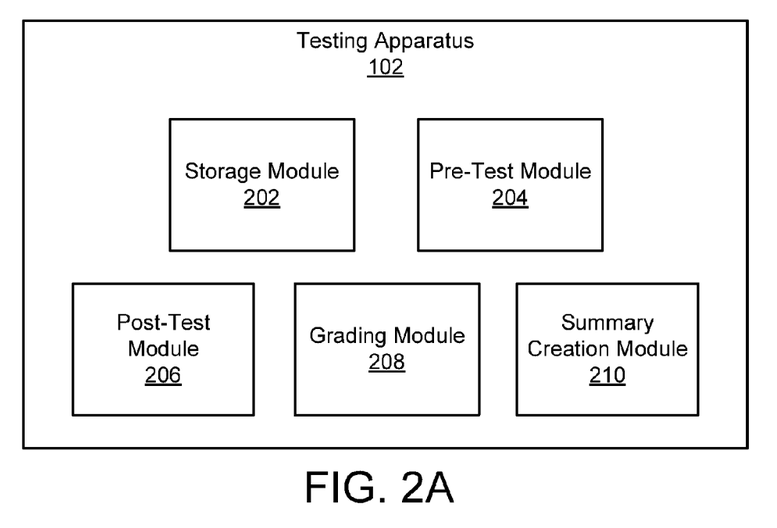
FIG. 2A is a schematic block diagram illustrating one embodiment of a testing apparatus for determining change in test results in accordance with the present invention.

FIG. 2A depicts one embodiment of the testing apparatus 102. In the embodiment, the testing apparatus 102 includes a storage module 202, a pre-test module 204, a post-test module 206, a grading module 208, and a summary creation module 210, which are described below. The testing apparatus 102 and its modules 202-210 facilitate providing portions of an education session for a user.

In one embodiment, the storage module 202 stores questions and at least one answer including a correct answer to each question. The questions may be on a single topic or multiple topics, including questions on sub-topics of each topic. For example, the questions stored by the storage module 202 may all be on topics related to health education such as a pre-natal health topic, a smoking topic, an exercise topic, and other topics without limitation.

The questions may be further divided into subtopics of each topic. For example, the questions related to the smoking topic may be divided into sub-topics such as dangers of second hand smoke, how to quit smoking, lung cancer risks, and the like. As will be clear to one skilled in the art in light of the present disclosure, the questions can range greatly in topic and subject matter. For example, the storage module 202 may store questions on a variety of topics including one or more of health topics, science topics, math topics, history topics, legal topics, and other topics without limitation.

In one embodiment, the questions stored by the storage module 202 may include multiple choice, true or false, matching questions, and the like. These types of questions facilitate grading with a computer. In a further embodiment, other types of questions, such as short answer questions, may also be included that are gradable by the grading module 208, which is discussed in more detail below.

In one embodiment, the storage module 202 includes a data storage repository where the storage module 202 stores the questions. For example, the data storage repository may include a database, spreadsheet file, text file, or other type of electronic data repository without limitation. According to a further embodiment, the data storage repository is stored on a data storage device comprising a computer readable medium.

In one embodiment, the pre-test module 204 pre-tests a user by submitting a group of pre-test questions to the user on the user interface 106. In a further embodiment, the group of pre-test questions is submitted to a group of users on the automated response system 112. The group of pre-test questions may be related to educational material which will be presented to the user following the pre-test. For example, if the educational material is related to a health topic, the pre-test questions may also be related to the health topic.

The pre-test questions submitted by the pre-test module 204 are selected from the questions stored by the storage module 202. In one embodiment, the pre-test module 204 includes computer code executable by a processor that includes instructions to submit questions stored by the storage module 202 to one or more users. The pre-test module 204 prompts the one or more users for an answer to the pre-test questions and the pre-test module 204 receives the pre-test answer.

In one embodiment, the post-test module 206 administers a post test to a user by submitting a group of post-test questions to the user after the user has been exposed to the educational material. In the embodiment depicted in FIG. 1A, the testing apparatus 102 may expose the user to the educational material, or the educational material may come from another source. The educational material may be provided, for example, by an instructor or a separate apparatus. As with the pre-test module 204, the questions submitted by the post-test module 206 are selected from the questions stored by the storage module 202 and may be related to the educational material.

In one embodiment, the post-test questions may include one or more of the same questions as the pre-test questions. In a further embodiment, the questions in the group of post-test questions are the same as the questions in the group of post-test questions. In another embodiment, the questions are the same with the possible answers rearranged. According to another exemplary embodiment, some of the questions are the same while some are different. In a further embodiment, the questions are all related to the same educational topic or subtopics, even if the questions are different. The post-test module 206 prompts the user for answers to the post-test questions and the post-test module 206 receives the user answers to the post-test questions ("post-test answers").

The pre-test module 204 provides the ability to test a latent knowledge of an individual on an educational topic. In other words, the pre-test module 204 allows the testing apparatus 102 to provide data relating to the knowledge the user had on a subject before being exposed to the educational material. After exposing the user to the educational material and post-testing the user with the post-test module 206, the testing apparatus 102 can use the pre-test answers and the post-test answers to determine what the user learned from being exposed to the educational material.

By testing latent knowledge, the testing apparatus 102 provides more reliable and accurate data about how much a user learned than can be determined from a single post test of a user. For example, if a user already knows the answers to all of the questions submitted in a post test, it may appear that the educational material was very effective when in fact the educational material may have had little effect on the user. In other situations, a user may know little on a given subject prior to being exposed to the educational material. After being exposed the user may achieve an only a moderate score, making it appear that the educational material was not effective, when in fact the user learned a significant amount.

The amount that a user learns in both of the testing situations described above is much more clearly understood using the testing apparatus 102, which determines how much the user learns from educational material. With the help of this information, a designer of the educational material may be able to improve the educational material to provide more effective teaching on the subject, or an administrator of the educational material may more effectively educate the user based on the information.

In response to the pre-test module 204 and post-test module 206 testing the user, in one embodiment, the grading module 208 grades a user's pre-test answers and post-test answers. In one embodiment, the grading module 208 may grade multiple choice, matching, or true/false answers, for example, by comparing the pre-test answers and the post-test answers to the corresponding correct answer and marking the pre-test answers and post-test answers correct if they match the correct answer.

In another embodiment, short answer questions are graded by the grading module 208 which compares the user pre-test or post-test answer to the correct answer and marks the pre-test or post-test answer correct if it closely matches the correct answer. For example, the correct short answer to a question may be the number "10". The grading module 208 may mark a pre-test or post-test answer of "10", "ten", or "10.0" as correct.

In one embodiment, the grading module 208 may accept input from a human in determining the status of a pre-test or post-test answer as correct or incorrect. In another embodiment, the grading module 208 automates the grading of questions without human input. In one embodiment, the correct answer to each question is stored by the storage module 202. In some embodiments, partial credit may be given by the grading module 208 for an answer that is perhaps not the best or most complete answer but is partially correct.

In response to the grading module 208 grading pre-test and post-test answers, the summary creation module 210 creates a session summary that includes a comparison between the user's pre-test answers and post-test answers. The comparison enables an individual interested in the effectiveness of the educational material or in the user's increase in knowledge to easily determine how much a user learned from being exposed to the material.

The summary creation module 210 can automatically create a comparison between the pre-test answers and the post-test answers in a variety of ways. The comparison may depend on the relationship between the pre-test questions and the post test questions. In one embodiment, the pre-test and post-test questions are exactly the same and given to the user in the same order. In other words, question one in the group of pre-test questions is the same as question one in the group of post-test questions and so on with the other questions.

Figure 6:
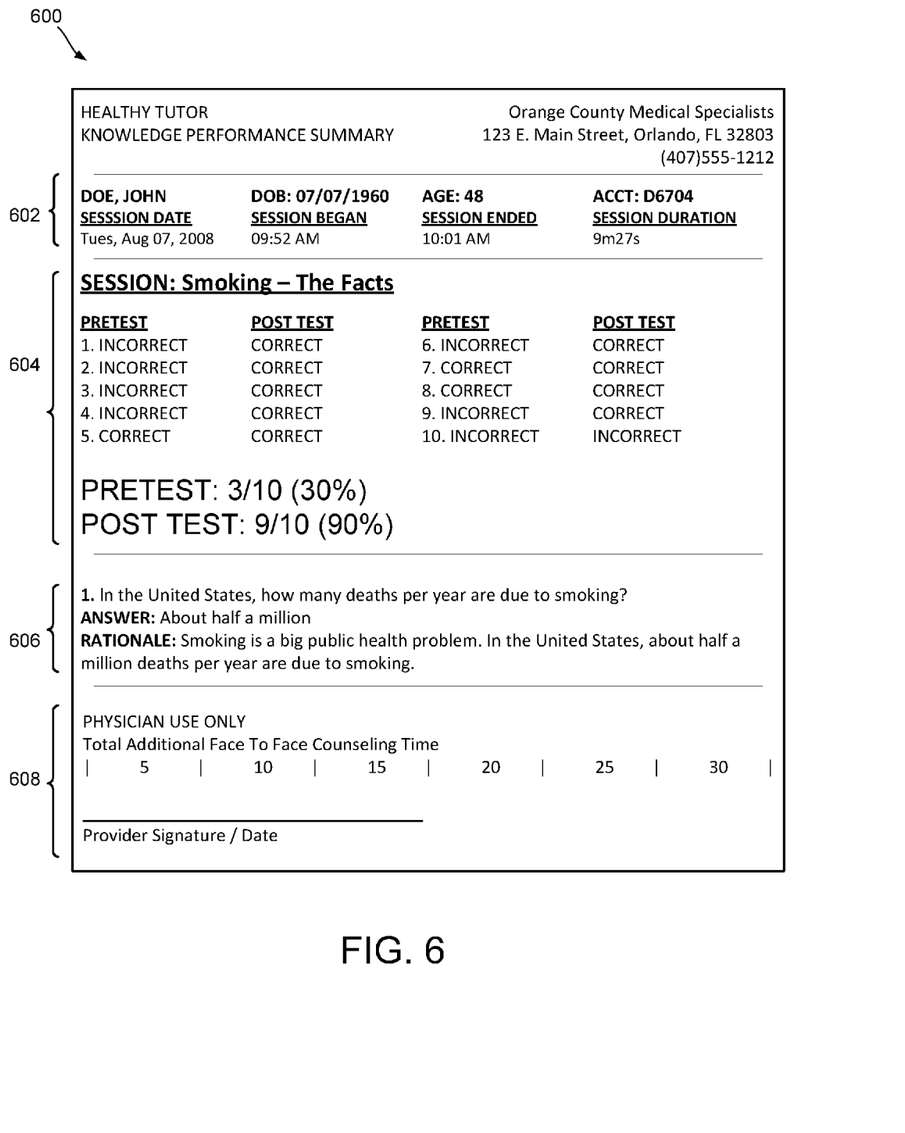
FIG. 6 is an illustration of an exemplary session summary in accordance with the present invention.

When the pre-test and post-test questions are identical and given in the same order, the comparison between the pre-test and post-test answers may include listing the pre-test answer to the first pre-test question and its status as correct or incorrect next to the post-test answer to the first post-test question and its status as correct or incorrect. The comparison may then include a similar listing between the rest of the pre-test and post-test answers. FIG. 6 shows an example of a comparison 604 that includes listing answers to identical questions next to each other. Listing the pre-test and post-test answers in this manner shows which answers the user learned from the educational material.

A similar comparison may be done in the session summary even if the questions are the same but are not submitted to the user in the same order. For example, question one of the pre-test questions may be the same as question seven of the post-test questions. In this case, the summary creation module 210 may list the questions in the session summary such that the status of answer one of the pre-test questions as right or wrong is listed next to the listing of the status of answer seven of the post-test questions as right or wrong. Thus, the order in which the pre-test and post-test questions are submitted may be varied during testing but an individual viewing the session summary can easily determine which pre-test and post-test answers correspond to each other. The individual will also be able to easily determine which answers were learned by the user from the educational material.

Some methods of comparing pre-test and post-test answers can be done regardless of whether or not the pre-test questions and post-test questions include similar questions. For example, the summary creation module 210 may list the pre-test and post-test answers by topic or subtopic in the session summary. The pre-test answers to questions relating to a certain topic or subtopic would be grouped together and listed next to the post-test answers to questions relating to the same topic. This grouping may be done even if none of the pre-test questions are the same as any of the post-test questions. Using this method, an individual viewing the session summary may be able to see how a user's understanding of a specific topic was improved during the presentation of educational material. This may be done whether or not there are identical question in the groups of pre-test and post-test questions.

In one embodiment, the session summary may include a percent correct score on the pre-test questions relating to the topic or subtopic listed next to a percent correct score on the post-test questions relating to the same topic or subtopic. Alternatively or additionally, the session summary may include a change in score on the topic or subtopic. For example, the user may have answered half (50%) of the pre-test questions on a certain topic correctly and then answered all (100%) of the post-test questions on the same topic correctly. Listing this improvement of 50% in the session summary may indicate that the educational material was effective.

Alternatively or additionally to the previously mentioned embodiments, the comparison in the session summary that is created by the summary creation module 210 may list a total correct score for the pre-test answers and a total correct score for the post-test answers. The total correct score may be a percentage, a fraction, or a number indicating the number of correct questions. In another embodiment, the summary creation module 210 may display the percent correct in the pre-test answers minus the percent correct in the post-test answers. This comparison shows the overall percent improvement made by the user in response to being exposed to the educational material.

The comparison in the session summary may alternatively or additionally include each pre-test and post-test answer and the status of each answer as correct or incorrect.

One embodiment of a comparison 604 in a session summary is depicted in FIG. 6, which is described below. Note that the above embodiments are exemplary and do not limit the scope of the invention. As will be understood by one skilled in the art in light of the present disclosure, the comparison between pre-test and post-test answers may be done in a variety of ways not mentioned herein.

The variations on the similarity or dissimilarity between the pre-test questions and the post-test questions, which variations are described above, may affect the accuracy with which a user's improved understanding can be measured. For example, if the pre-test questions and the post-test questions are substantially different, a change in score between the pre-test and post-test may be due simply to the user's latent knowledge. An accurate understanding of a change in knowledge may not be discernable in this situation. If the pre-test questions and post-test questions are different, but relate closely to similar principles of a topic but are phrased differently to get at a similar idea, a more accurate understanding may be possible by comparing the pre-test and post-test answers.

In another embodiment, the pre-test questions and post-test questions may be the same, and the possible answers, for example in a multiple choice question, may be rearranged. This may provide a fairly accurate understanding of the user's improved knowledge, while providing a slight difference in the questions. The pre-test questions and post-test questions, in another embodiment, may be identical. Identical questions may lead to a more accurate understanding of what a user learned. An author of the pre-test questions and the post-test questions may take such issues into account.

In addition to the comparison between the post-test questions and the pre-test questions, the session summary that the summary creation module 210 creates may also include a variety of other information. In one embodiment, the summary creation module 210 includes in the session summary the full text of the questions that the pre-test module 204 and the post-test module 206 submitted to the user. In another embodiment, the summary creation module 210 includes an explanation for the correct answer to each question in the session summary. The session summary may also include identifying personal information of the user such as a name, identification number, date of birth, or other personal information without limitation. The session summary may further include a date and/or location to record when and/or where the education session took place.

The summary creation module 210, in a further embodiment, may send the session summary to the user interface 106 for the user to review. The summary creation module 210 may further send the session summary to an owner or administrator of the testing apparatus 102 for tracking of test takers and test scores, or the like. In one embodiment, the summary creation module 210 sends the session summary to a designer or administrator of the educational material. In another embodiment, the session summary is sent to a secure session database 108 for storage and subsequent access. The session summary may also be sent to other parties or systems that are involved in the user's health such as parties or systems 110-118 of FIG. 1.

According to one exemplary embodiment, the educational material, pre-test questions, and post-test questions relate to an educational health topic. The educational health topic may relate to the medical health and/or treatment of a user. For example, a health provider may recommend that a user complete an education session on a topic related to the user's health. The health provider may use the session summary for proof of the education session, for billing purposes, for reference in further treatment, or for reimbursement purposes. In one embodiment, the session summary is sent to an insurance provider 110 such as insurance company, Medicaid, or Medicare reimbursement, or the like.

The session summary may also include information that is required by an insurance provider 110 or a government agency in order for a health provider to obtain payment or reimbursement, such as a billing code, signature, etc. An example session summary used for health purposes is shown in FIG. 6, which is discussed below.

Figure 2B:
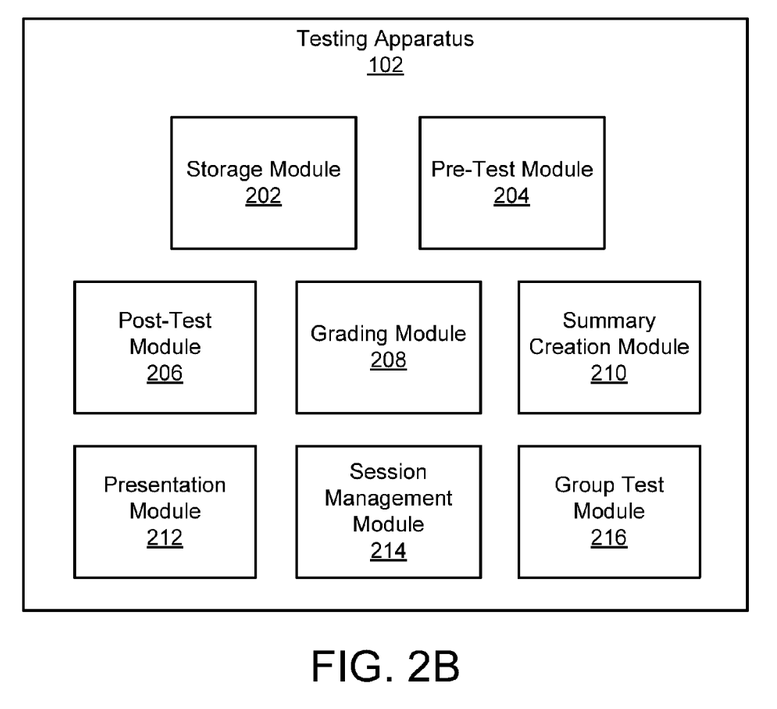
FIG. 2B is a schematic block diagram illustrating another embodiment of a testing apparatus for determining change in test results in accordance with the present invention.

FIG. 2B depicts one embodiment of a testing apparatus 102 with additional exemplary modules to provide additional services or functionality. The testing apparatus 102 of FIG. 2B includes a storage module 202, a pre-test module 204, a post-test module 206, a grading module 208, and a summary creation module 210, which are substantially similar to those described in relation to the testing apparatus 102 of FIG. 2A. The testing apparatus 102 depicted in FIG. 2B also includes a presentation module 212, a session management module 214, and a group test module 216, which are described below. An exemplary embodiment of the present invention may include none, one, or more of the presentation module 212, the session management module 214, and the group test module 216.

In one embodiment, the testing apparatus 102 includes a presentation module 212 that presents educational material to a user in response to the pre-test module 204 receiving pre-test answers from the user. In one exemplary embodiment, the educational material includes multimedia material such as images, videos, sounds, text, etc. which are presented to the user. In one embodiment, the educational material is presented to a user on a user interface 106 or automated response system 112 over a computer network. The presentation module 212, in one embodiment, allows the testing apparatus 102 to completely automate an education session for one or more users. For example, a user may be able to take the pre-test, be exposed to educational material, and take the post-test on a single user interface 106 or automated response system 112. Such a process may take little or no intervention by any other person besides the user or users.

In another embodiment, the testing apparatus 102 includes a session management module 214 that allows a user to selectively begin a new education session in response to the post-test module 206 receiving post-test answers from a user. In one embodiment, the session management module 214 prompts a user through a Graphical User Interface 106 ("GUI") to select a "Yes" button or other means acknowledging consent to begin a new education session or a "No" button or means acknowledging dissent to not begin a new education session. In one exemplary embodiment, a user can complete multiple education sessions on one or more topics or subtopics until the user selects not to continue.

In one embodiment, the group test module 216 allows the testing apparatus 102 to test multiple users at a time while maintaining user answers and personal information confidential. For example, the group test module 216 may submit the pre-test questions from the pre-test module 204 to multiple users instead of just a single user, and may in turn receive pre-test answers for each question from each of the users. The group test module 216 does not display the pre-test and post-test answers of each individual for others to see, maintaining the answers in confidence. According to one embodiment, the group test module 216 also submits educational material from the presentation module 212 to the multiple users.

In one embodiment, the testing apparatus 102 and group test module 216 of FIG. 1B may be used with an automated response system 112 to test multiple users at the same time. In another embodiment, the automated response system 112 includes a display, and one or more electronic devices by which multiple users may respond to questions presented on the display. For example, multiple users may be pre-tested by the pre-test module 204 with the pre-test questions shown on the automated response system 112 display, and each user may enter pre-test answers using the one or more electronic devices.

In one embodiment, the automated response system 112 may include separate booths for the one or more electronic devices where users can confidentially enter their answers. In another embodiment, multiple users are seated in a single room in a classroom setting with a large display, such as a projector screen, and each user can utilize a separate remote device, such as a laptop computer, dedicated keypad, etc., to discretely enter an answer in response to a pre-test or a post-test question. The group test module 216 maintains the pre-test and post-test answers of each user confidential from the other users such that all users can be tested simultaneously without concern of having their personal data or knowledge exposed to others.

Figure 3:
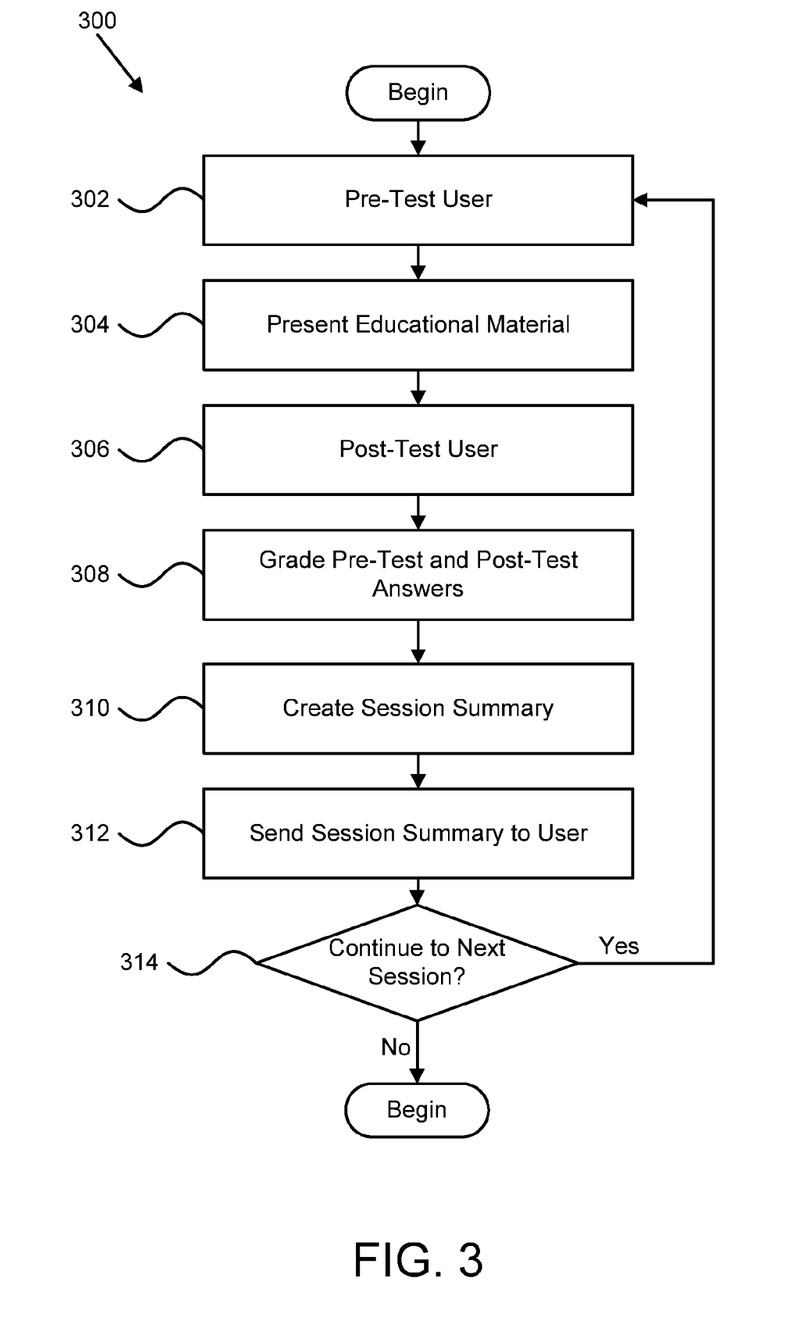
FIG. 3 is a schematic flow chart diagram illustrating one embodiment of a method for determining change in test results in accordance with the present invention.

FIG. 3 depicts one embodiment of a method 300 for determining change in test results. In the depicted embodiment, the method 300 starts and the pre-test module 204 pre-tests 302 a user. The details of pre-testing 302 the user are described below in relation to FIG. 4. In response to the pre-test 302, educational material is presented to the user 304. In one embodiment, an instructor presents 304 the educational material. In another embodiment, the presentation module 212 presents 304 the educational material to the user. In response to the user being presented 304 educational material 304 the post test module 206 post-tests 306 the user. The details of post-testing 306 the user are described below in relation to FIG. 5. In response to the post-test module 206 post-testing 306 the user, the grading module 208 grades 308 the pre-test and post-test answers. In one embodiment, the grading module 208 marks each answer correct if it matches the correct answer.

The summary creation module 210 creates 310 a session summary including a comparison between the pre-test and post-test questions. In one exemplary embodiment, the session summary includes additional information, such as disclosed in embodiments above. In the depicted embodiment, the summary creation module 210 sends the session summary to the user 312. As will be understood in light of the present disclosure, the summary creation module 210 may additionally or alternatively send the session summary to another party or system involved in the user's health, such as parties or systems 110-118 of FIG. 1. Alternatively or additionally the session summary may be sent to another individual or organization such as a relative or testing organization.

In one embodiment, the session management module 214 prompts the user to selectively continue 316 to another session. In one embodiment, the user may continue to another session by selecting "Yes" and may decline to continue by selecting "No." In one embodiment, if the user selects "Yes", the method returns to step 302. If the user selects "No", the method ends 318.

Figure 4:
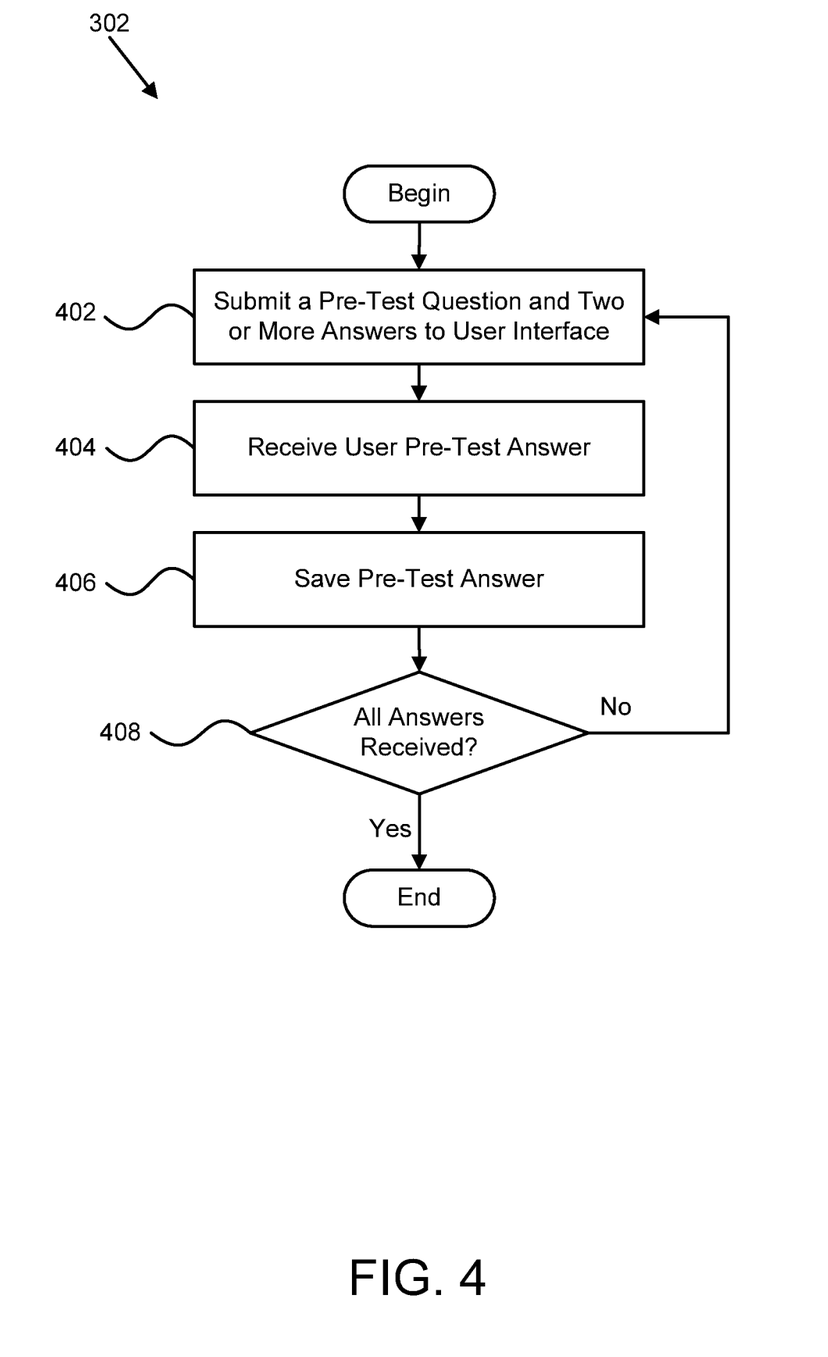
FIG. 4 is a schematic flow chart diagram illustrating one embodiment of a pre-test process in accordance with the present invention.

FIG. 4 depicts one embodiment of a method for pre-testing 302 the user. The pre-testing 302 begins and the pre-test module 204 submits 402 a pre-test question and two or more answers to the user interface 106. The two or more answers may be two or more possible answers, for example, to a multiple choice question. Following entry of a pre-test answer by the user, the pre-test module 204 receives 404 the pre-test answer. The pre-test module 204 saves 406 the user pre-test answer. In the depicted embodiment, the pre-test module 204 then checks 408 to see if all pre-test answers have been received. If not, the pre-test module 204 submits 402 another question and the sequence repeats. If all the pre-test answers have been received 408 then pre-testing ends.

Figure 5:
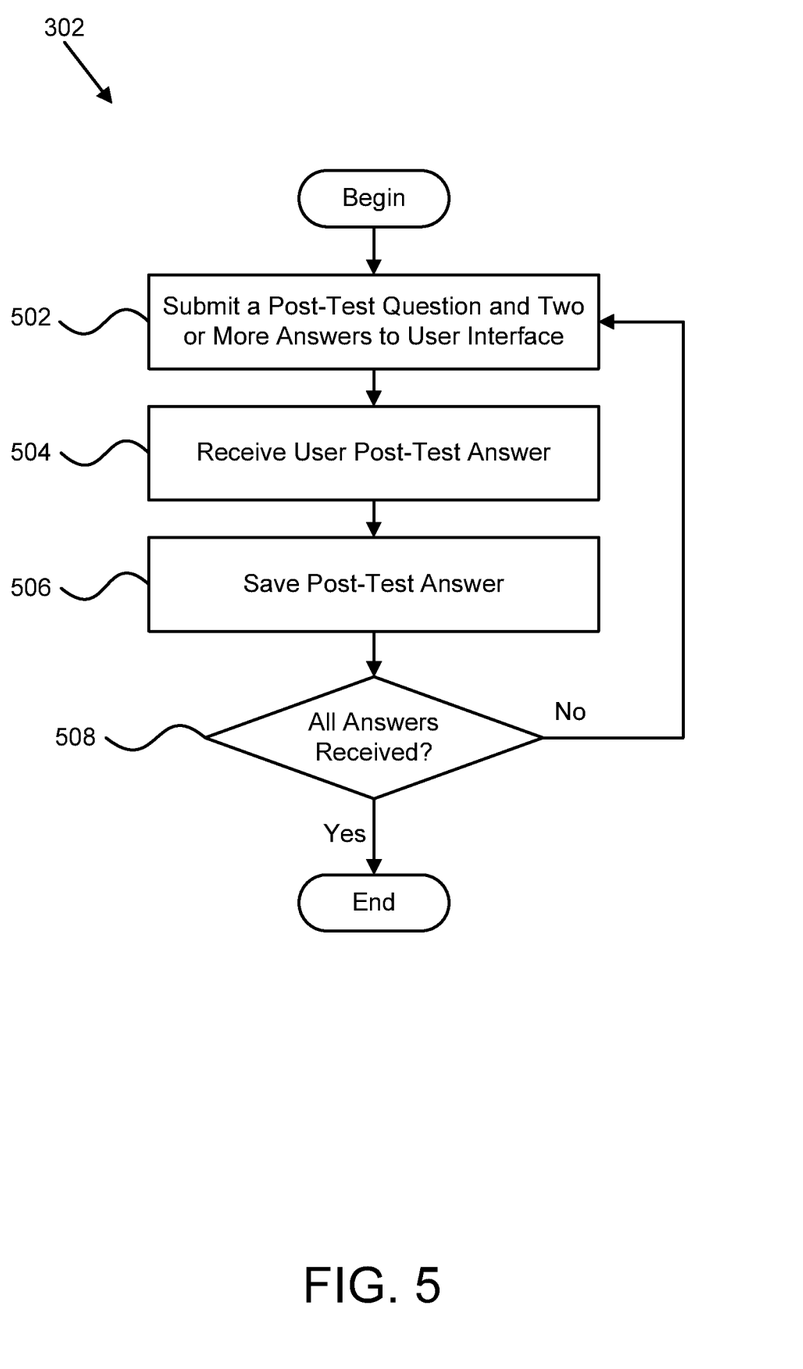
FIG. 5 is a schematic flow chart diagram illustrating one embodiment of a post-test process in accordance with the present invention.

FIG. 5 depicts one embodiment of a method for post-testing 306 the user. The post-testing 306 begins and the post-test module 206 submits 502 a post-test question and two or more answers to the user interface 106. The two or more answers may be two or more possible answers, for example, to a multiple choice question. The post-test question may be the same as one of the pre-test questions. Following entry of a post-test answer by the user, the post-test module 206 receives 504 the post-test answer. The post-test module 206 saves 506 the user post-test answer. In the depicted embodiment, the post-test module 206 then checks 508 to see if all post-test answers have been received. If not, the post-test module 206 submits 502 another question and the sequence repeats. If all the post-test answers have been received 508 then pre-testing ends.

FIG. 6 depicts one embodiment of an exemplary session summary 600. In one embodiment, the session summary 600 is in one or more of a PDF document format, hypertext markup language (HTML) format, text format, or any other format. The session summary 600 summarizes an education session on a health topic of smoking and is representative of a session summary used for health purposes. The session summary 600 includes user and time information 602. The exemplary user, John Doe, may have taken this test as requested by a health provider because he is a smoker. The session summary 600 includes a comparison 604 between pre-test answers and post-test answers for John Doe. In the depicted embodiment, the pre-test and post-test questions were exactly the same.

The comparison 604 includes the status as correct or incorrect for each answer. For example, John Doe answered incorrectly to question 1 during the pre-test but correctly during the post-test. The comparison 604 further includes the percent correct for the pre-test (30%) and the percent correct for the post-test (90%) listed next to each other. This allows for a quick understanding of how much John Doe learned during the education session. The session summary 600 also includes a question section 606 which may list all of the questions, the correct answers and explanations for the correct answers. In the depicted embodiment, only questions one is listed for simplicity. If the session summary 600 was provided to the user John Doe, he may learn even more about smoking by reviewing the session summary 600. The session summary 600 also includes a provider records section 608 where a health provider may provide additional information for billing purposes such as the additional face to face counseling time and a signature. Such information may be useful for the provider to receive payment for the service given by the provider. As will be clear to one skilled in the art and in light of the present disclosure, the depicted session summary 600 represents only an exemplary embodiment. Variations on style, placement, and specific content can vary within specific embodiments, as described above.

Medical Billing Codes and Billing Methods

This section includes a number of tables and descriptions of exemplary billing methods and billing codes which may be used to charge for an education session and/or related counseling.

The following table is directed towards billing methods, codes, and reimbursement for education sessions and/or related counseling as preventative health.

| Preventive Health Reimbursement | |
|---|---|
| CPT/HCPCS Codes | Description |
| 99401 | Preventive medical counseling and/or risk factor reduction intervention(s), 15 minutes |
| 99402 | Preventive medical counseling and/or risk factor reduction intervention(s), 30 minutes |
| 99403 | Preventive medical counseling and/or risk factor reduction intervention(s), 45 minutes |
| 99404 | Preventive medical counseling and/or risk factor reduction intervention(s), 60 minutes |
| 99406* | Smoking and tobacco use cessation counseling visit; intermediate, greater than 3 minutes up to 10 minutes |
| 99407* | Smoking and tobacco use cessation counseling visit; intensive, greater than 10 minutes |
| 99408 | Alcohol and/or substance (other than tobacco) abuse structured screening (eg, AUDIT, DAST), and brief intervention (SBI) services; 15 to 30 minutes |
| 99409 | Alcohol and/or substance (other than tobacco) abuse structured screening (eg, AUDIT, DAST), and brief intervention (SBI) services; greater than 30 minutes |
| 99411 | Preventive medicine counseling and/or risk factor reduction intervention(s) provided in a group setting (separate procedure); approx. 30 minutes |
| 99412 | Preventive medicine counseling and/or risk factor reduction intervention(s) provided in a group setting (separate procedure); approximately 60 minutes |

-continued

Preventive Health Reimbursement

| CPT/HCPCS Codes | Description |
|---|---|
| G0396 | Alcohol and/or substance (other than tobacco) abuse structured assessment (e.g., AUDIT, DAST), and brief intervention 15 to 30 minutes |
| G0397 | Alcohol and/or substance (other than tobacco) abuse structured assessment (e.g., AUDIT, DAST), and intervention, greater than 30 minutes |

*Note: Medicare covers 99406 and 99407 for a combined total of 8 sessions per 12 month period.

The following table includes information about reimbursement using CPT codes.

REIMBURSEMENT METHODS INCLUDING CPT CODE

98960 - Education and training for patient self-management.

Each 30 minutes, individual patient. Requires a qualified, non-physician healthcare professional using a standardized curriculum, face-to-face with the patient (could include caregiver and/or family).
98961 - Education and training for patient self-management.

Each 30 minutes, 2-4 patients. Requires a qualified, non-physician healthcare professional using a standardized curriculum, face-to-face with the patient (may include caregiver and/or family).
98962 - Education and training for patient self-management.

Each 30 minutes, 5-8 patients. Requires a qualified, non-physician healthcare professional using a standardized curriculum, face-to-face with the patient (may include caregiver and/or family).
99071 Reimbursement for Educational Supplies Digital and multi-media patient video education programs and paper handouts are all considered within the process of instruction, preparation of appropriate materials, and review of them with your patient remains similar. Patient multi-media and video education programs can legitimately be classified as patient education material.

-continued

REIMBURSEMENT METHODS INCLUDING CPT CODE 99201-99205 Office Visits, New Patients Counseling the patient regarding disease related health education is a covered counseling component of the office visit event.
99212-99215 Office Visit, Established Patients Counseling the patient regarding disease related health education is a covered counseling component of the office visit event.
Diabetes Self-Management Training (DSMT) G0108-G0109

G0108 - Diabetes outpatient self-management training services, individual, per 30 minutes
G0109 - Diabetes outpatient self-management training services, group (2 or more), per 30 min.
Corporate Sponsorship Sponsorship from corporation wellness partners is a common method of recovering costs associated with prescribing patient multi-media and video education program content.
Patient Out-Of-Pocket Out of pocket payment is a common method of payment for multi-media healthcare content usage. Clinics may opt to consider patient multi-media programs as a cost of treatment. In this case the patient or insurance carrier is not billed separately.

This table is based on information found at: http://www.itherapies.com/support/support_patient/rxbox-patient.htm-PatientFAQ_General_Top The following table includes information about the Physician Quality Reporting Initiative which may relate to certain aspects of the apparatus, systems, and methods discussed herein.

1008 Physician Quality Reporting Initiative
Eligible Professional Quality Measures Definition: PQRI establishes a financial incentive for eligible professionals to participate in a voluntary quality reporting program tied closely to Pay For Performance initiatives. Eligible professionals who successfully report PQRI quality measures may earn a bonus payment of 1.5% of total allowed charges for covered services payable under the Medicare Physician Fee Schedule.
47. Advance Care Plan Description: Percentage of patients aged 65 years and older who have an advance care plan or surrogate decision maker documented or documentation in the medical record that an advance care plan was discussed but the patient did not wish or was not able to name a surrogate decision maker or provide an advance care plan in the medical record.
89. Counseling Patients with HCV Regarding Use of Alcohol Description: Percentage of patients aged 18 years and older with a diagnosis of hepatitis C who received education regarding the risk of alcohol consumption at least once within the 12-month reporting period.

| 1008 Physician Quality Reporting Initiative Eligible Professional Quality Measures |
|---|
| 90. Counseling of Patients Regarding Contraception Use Prior to Starting Antiviral Therapy |
| Description: Percentage of female patients aged 18 through 44 years and all men aged 18 years and older with a diagnosis of chronic hepatitis C who are receiving antiviral treatment who were counseled regarding contraception prior to the initiation of treatment. 115. Advising Smokers to Quit |
| Description: Percentage of patients aged 18 years and older and are smokers who received advice to quit smoking. 129. Universal Influenza Vaccine Screening and Counseling |
| Description: Percentage of patients aged 50 years and older who were screened and counseled about the influenza vaccine January-March, October-December. 132. Patient Co-Development of Treatment Plan/Plan of Care |
| Description: Percentage of patients aged 18 years and older identified as having actively participated in the development of the treatment plan/plan of care. 133. Screening for Cognitive Impairment |
| Description: Percentage of patients aged 65 years and older who have documentation of results of a screening for cognitive impairment using a standardized tool. |

As of Dec. 14, 2007, this table is based on information at: http://www.cms.hhs.gov/PQRI/Downloads/1008PQRIMeasuresList.pdf The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for determining change in test results, the apparatus comprising:
   a storage module that stores a plurality of questions and a correct answer to each question in a data storage repository, the plurality of questions related to health;
   a pre-test module that submits a group of pre-test questions to a user and receives answers to the pre-test questions from the user ("pre-test answers"), the group of pretest questions selected from the plurality of questions;
   a post-test module that, in response to the user being exposed to educational material related to the pre-test questions, submits a group of post-test questions to the user and receives answers to the post-test questions from the user ("post-test answers"), wherein the post-test questions are selected from the plurality of questions and are related to the educational material, the educational material related to health;
   a grading module that compares the pre-test answers and the post-test answers to the correct answer for each corresponding question and marks an answer correct in response to the answer matching the correct answer for the corresponding question; and
   a summary creation module that creates a session summary comprising a comparison between the pre-test answers and the post-test answers and sends the session summary to a secure session summary database at one or more of
      a health provider;
      a corporate wellness provider;
      a personal health records system; and
      an electronic medical records system,
   wherein the secure session summary database and the send transaction are Health Insurance Portability and Accountability Act ("HIPAA") compliant and the session summary is incorporated into a personal health record of the user such that access to the session summary is limited to one or more users having access to the personal health record of the user,
   wherein the pre-test questions and post-test questions are submitted over a computer network and the pre-test answers and post-test answers are received over the computer network.

2. The apparatus of claim 1, wherein the comparison between the pre-test answers and the post-test answers comprises one or more of:
   an overall score on the pre-test questions and an overall score on the post-test questions;
   a comparison between an overall score on the pre-test questions and an overall score on the post-test questions; and
   a comparison between pre-test answers and post-test answers for questions on similar topics.

3. The apparatus of claim 1, wherein the group of pre-test questions and the group of post-test questions comprise one or more of the same questions.

4. The apparatus of claim 3, wherein the comparison between the pre-test answers and the post-test answers comprises comparing a pre-test answer and a post-test answer that correspond to the same question based on a difference between the pre-test answer and the post-test answer.

5. The apparatus of claim 1, wherein the session summary further comprises one or more of,
   the pre-test questions;
   the post-test questions;
   the pre-test answers;
   the post-test answers;
   the correct answers to the pre-test questions;
   the correct answers to the post-test questions;
   an explanation corresponding to each correct answer; and
   an explanation corresponding to each incorrect answer.

6. The apparatus of claim 1, further comprising a presentation module that presents the educational material related to the pre-test questions to the user in response to the receipt of the answers to the group of pre-test questions from the user.

7. The apparatus of claim 1, wherein user identifying information, the user pre-test answers, and the user post-test answers are stored in the secure session summary database.

8. The apparatus of claim 1, wherein the secure session summary database is accessible over the computer network from a plurality of locations.

9. The apparatus of claim 1, wherein the session summary further comprises a provider records section for recording provider interaction with the user.

10. The apparatus of claim 1, wherein the session summary comprises information satisfying requirements for one or more of medical insurance reimbursement and Medicare reimbursement.

11. The apparatus of claim 1, wherein the session summary further comprises a medical billing code.

12. The apparatus of claim 11, wherein the secure session summary database is accessible by an insurance provider and wherein the medical billing code comprises a code recognized by the insurance provider as identifying an item eligible for insurance payment by the insurance provider.

13. The apparatus of claim 1, further comprising a group test module that tests a group during a group education session and maintains personal user information and user answers confidential, the group comprising the user and one or more additional users, a group education session comprising concurrently pre-testing, teaching, and post-testing the user and the one or more additional users in the group.

14. The apparatus of claim 13, wherein the group test module comprises an automated response system that receives answers from the user and the one or more additional users, the user and the one or more additional users each submitting the answers using an electronic device.

15. The apparatus of claim 1, further comprising a session management module that allows the user to selectively begin a new education session in response to receiving the user post-test answers, an education session comprising pre-testing, presenting educational material, and post-testing the user.

16. A system for determining change in test results, the system comprising:
 a data storage device that stores a plurality of questions;
 a processor;
 an apparatus for determining change in test results, the apparatus comprising,
  a storage module that stores a plurality of questions and a correct answer to each question in a data storage repository, the plurality of questions related to health;
  a pre-test module that submits a group of pre-test questions to a user and receives answers to the pre-test questions from the user ("pre-test answers"), the group of pretest questions selected from the plurality of questions;
  a post-test module that, in response to the user being exposed to educational material related to the pre-test questions, submits a group of post-test questions to the user and receives answers to the post-test questions from the user ("post-test answers"), wherein the post-test questions are selected from the plurality of questions and are related to the educational material, the educational material related to health;
  a grading module that compares the pre-test answers and the post-test answers to the correct answer for each corresponding question, marks an answer correct in response to the answer matching the correct answer for the corresponding question; and
  a summary creation module that creates a session summary comprising a comparison between the pre-test answers and the post-test answers and sends the session summary to a secure session summary database at one or more of
   a health provider;
   a corporate wellness provider;
   a personal health records system; and
   an electronic medical records system,
  wherein the secure session summary database and the send transaction are Health Insurance Portability and Accountability Act ("HIPAA") compliant and the session summary is incorporated into a personal health record of the user such that access to the session summary is limited to one or more users having access to the personal health record of the user,
  wherein the questions are submitted and the answers are received over a network.

17. The system of claim 16, further comprising an automated response system that receives answers from the user and the one or more additional users, the user and the one or more additional users each submitting the answers using an electronic device.

18. A method for determining change in test results, the method comprising:
 storing a plurality of questions and a correct answer to each question in a data storage repository, the plurality of questions related to health;
 submitting a group of pre-test questions to a user and receiving answers to the pre-test questions from the user ("pre-test answers"), the group of pretest questions selected from the plurality of questions;
 submitting a group of post-test questions to the user, in response to the user being exposed to educational material related to the pre-test questions, and receiving answers to the post-test questions from the user ("post-test answers"), wherein the post-test questions are selected from the plurality of questions and are related to the educational material, the educational material related to health;
 grading the pre-test answers and the post-test answers to the correct answer for each corresponding question by marking an answer correct in response to the answer matching the correct answer for the corresponding question; and
 creating a session summary comprising a comparison between the pre-test answers and the post-test answers and sends the session summary to a secure session summary database at one or more of
  a health provider;
  a corporate wellness provider;
  a personal health records system; and
  an electronic medical records system,
 wherein the secure session summary database and the send transaction are Health Insurance Portability and Accountability Act ("HIPAA") compliant and the session summary is incorporated into a personal health record of the user such that access to the session summary is limited to one or more users having access to the personal health record of the user,
wherein the questions are submitted and the answers are received over a network.

* * * * *